June 29, 1926.

N. A. OLSSEN ET AL 1,590,203

GLARESHIELD FOR AUTOMOBILES

Filed Jan. 31, 1925

Inventor  
Norman A. Olssen.  
William I. Jones.

By  
A. J. O'Brien  
Attorney

Patented June 29, 1926.

UNITED STATES PATENT OFFICE.

1,590,203

NORMAN A. OLSSEN AND WILLIAM IRVING JONES, OF DENVER, COLORADO.

GLARESHIELD FOR AUTOMOBILES.

Application filed January 31, 1925. Serial No. 5,977.

This invention relates to improvements in the construction of automobile glare shields of the type described and claimed in application Serial No. 752,617, filed by Norman A. Olssen on November 28, 1924.

It is well known to everyone with the least experience in night driving that one of the most disagreeable and dangerous features connected therewith is the glaring lights with which the automobiles are equipped. As nothing seems to be done to remedy the defects in the illuminating systems, now so extensively employed, it becomes necessary for each car owner to protect himself as best he may against the menace of the glaring lights which continually threaten to blind him.

In the application above referred to there has been described and claimed a glare shield that is admirably adapted for the purpose of protecting a driver against the blinding effect of headlights on approaching cars. We have found, however, that it is desirable to slightly modify the construction shown and described in the above entitled application in order to obtain the best results.

It is the object of this invention to produce a device that shall be so constructed that it will be convenient to operate and which will remain in the position to which it is adjusted, regardless of the vibrations to which it must necessarily be subjected.

Our invention can be most clearly described and will be most readily understood when reference is had to the accompanying drawing in which the device is illustrated in its preferred embodiment and in which Fig. 1 is a view taken from the driver's seat looking towards the front of the cars and shows the glare shield in place.

Our improved glare shield consists of a piece of colored glass or other transparent material 1 that is clamped in the jaws 2 which are provided in the ends of the bar 3. For the purpose of supporting the glass shield in an adjustable manner so that it may readily be moved to the desired position and retained in that position as long as necessary, we have provided a support comprising three sections, A, B and C interconnected in a manner and by means that will now be described.

Figure 1:
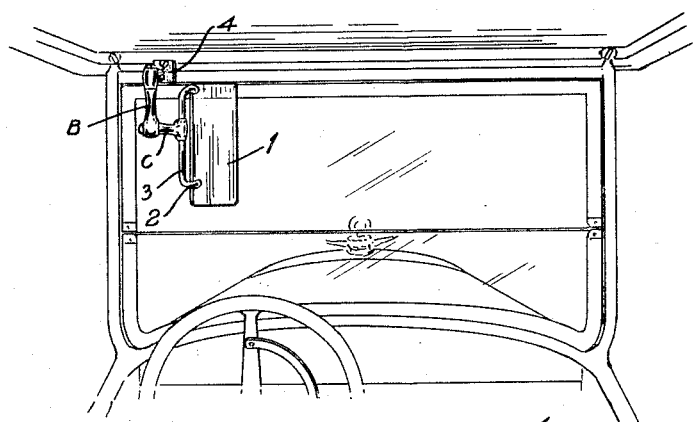
Figure 3:
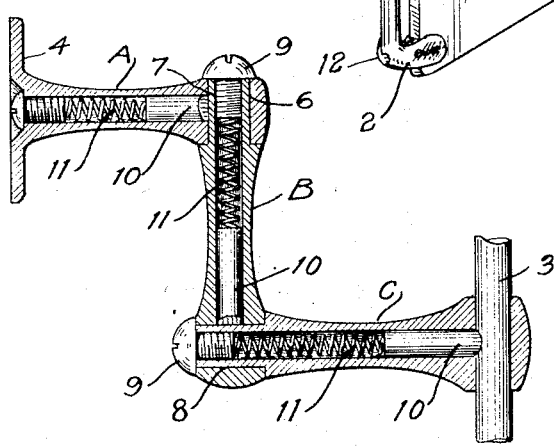
Fig. 3 is a section taken on line 3—3 Fig. 2 and shows the manner in which the friction joints are constructed.

The section A, when it is to be employed in connection with an enclosed car, has a base 4 that is provided with a plurality of openings 5 for the reception of the screws by means of which it is attached to the framework of the car in the manner shown in Fig. 1. The other end of the section A has an opening 6 whose axis extends transversely of the longitudinal axis of the section. A second section, which we have designated by the letter "B" has a portion 7 that is of the proper size to fit the opening 6. Section B is attached to section A in the manner shown in Fig. 3. The lower end of section B has a transverse opening 8 that corresponds to the opening 6 in section A. Secured to section B is a section which I have designated by the letter C and which is identical in shape and size with section B. The three sections A, B and C are assembled in the manner shown in Fig. 3 and are held in assembled relation by means of screws 9. The outer end of section C has a transverse opening that corresponds to the openings 6 and 8 of sections A and B; this opening receives the rod 3 which is slidable therein. It will be noted that sections A, B and C are all provided with an axial opening that intersects the transverse opening. Located within each of these openings is a wooden plug 10 that is acted upon by the helical spring 11 which shoves it against the outer surface of the adjacent member so as to produce friction that prevents relative rotation. By means of the construction just described a bracket is obtained that can be adjusted to any desired position and which will have sufficient friction to cause it to remain in adjusted position. The constant friction caused by the wooden plugs 10 produces an adjustable assembly of parts that retain their adjusted position in the face of constant vibration. We also want to call attention to the fact that the rod 3 can be longitudinally adjusted in the section C as well as rotatably adjusted. The ends of the rod 3 are provided with clamping jaws 2 that have one part 12 formed from a separate piece and held in place by means of a screw.

Figure 2:
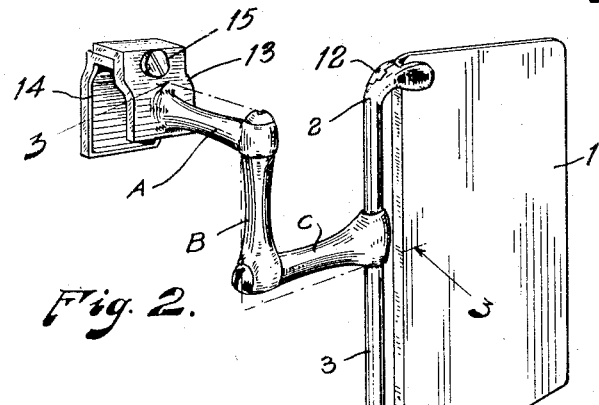
Fig. 2 is a perspective view of a glare shield showing the same detached from the car and provided with a clamp by means of which it may be attached to the windshield frame of an automobile.
Figure 4:
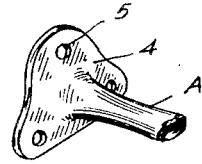
Fig. 4 shows the construction, of the bracket, that is employed when the shield is to be attached to the framework of an enclosed car.

When the shield is to be employed in connection with a windshield frame of an open car, the section A is provided with a clamp such as the one shown in Fig. 2 and which consists of two opposed jaws 13 and 14 held together by means of a bolt or screw 15. The bracket described above has three sections, one of which is adapted to be secured to a stationary support and is provided with an opening extending transversely through the outer end and within which the next section is rotatably mounted. The second section being also provided with a transverse opening for the reception of the third section. It is to be noted that the three sections are so related that the longitudinal axis of each is at right angles to the longitudinal axis of the adjacent section. The friction means employed is also believed to be new and when used in this combination produces a device that is easily adjusted and which remains in adjusted position. It is not the intention that the driver shall view the road through the colored glass 1, but rather that the shield shall be so adjusted that it is interposed between the driver's eyes and the lights of the approaching vehicle so that the driver may see the road by looking to the right of the shield.

Having now described our invention, what we claim as new is:

An adjustable bracket for use in connection with glare shields for automobiles, said bracket comprising in combination three elongated tubular sections, one of which has a base provided at one end with means by which it may be secured to a stationary portion of an automobile and having a transverse opening at the other end which serves as a bearing, a second tubular section having a journal at one end that is adapted to fit the bearing in the first member and a transverse bearing at the other end, means for preventing the journal of the second member to be withdrawn from the bearing in the first member, a third section of substantially the same construction as the second having its journal operatively associated with the bearing of the second member, means for preventing the third member from being separated from the second section, a U-shaped member slidable in the bearing of the third section and friction means in each section for engaging the movable portions within the bearings, said means comprising a plug slidably mounted therewithin and urged against the movable member by a compression spring.

In testimony whereof we affix our signatures.

NORMAN A. OLSSEN.
WILLIAM IRVING JONES.